3,192,180
BACTERIOSTATIC COMPOSITIONS OF ACRYLONITRILE POLYMERS AND 2,4-DIHYDROXYBENZOPHENONE
Fred J. Lowes, Jr., Midland, Mich., assignor to The Dow Chemical Company, Midland, Mich., a corporation of Delaware
No Drawing. Filed Mar. 16, 1962, Ser. No. 180,305
5 Claims. (Cl. 260—45.95)

This invention relates to bacteriostatic compositions of polyacrylonitrile or of copolymers containing at least 85 weight percent of acrylonitrile in the polymer molecule and minor but effective amounts of 2,4-dihydroxybenzophenone, and to articles made from such compositions.

Polyacrylonitrile and many of the fiber and film-forming copolymers of acrylonitrile may advantageously be fabricated by a wet spinning process wherein the polymer composition is extruded from compositions of the polymer in polyacrylonitrile-dissolving aqueous saline solvents particularly aqueous solutions of zinc chloride and its saline equivalents. Such a procedure, as is well known in the art, is oftentimes referred to as salt-spinning with the fibers (or other shaped articles) obtained thereby being salt-spun. In salt-spinning, the fiber-forming, aqueous saline spinning solution or other composition of the polymer is extruded during the spinning operation into a non-polymer dissolving coagulation liquid or spin bath, which frequently is a solution of the same salt or salts as are in the spinning solution.

Acrylonitrile polymers (including fiber-forming copolymers), particularly polyacrylonitrile, that are salt-spun in the referred-to manner are generally formed initially as aquagel intermediates. Such intermediates have a water-swollen or hydrated structure prior to their being finally irreversibly dried to the desired, characteristically hydrophobic, product.

Advantageously, the aquagel structure of polyacrylonitrile and other fiber and film-forming acrylonitrile polymers may be derived by the extrusion of a solution of the acrylonitrile polymer that is dissolved in an aqueous zinc chloride saline solvent therefor into and coagulation in an aqueous coagulating spin bath. It is usually desirable for zinc chloride to be at least the principal (if not the entire) saline solute in the aqueous solvent solution.

If preferred, however, various of the saline equivalents for zinc chloride may also be employed in the aqueous saline solvent medium for the spinning solution and the coagulating bath utilized. These zinc chloride equivalents, as is well known, include various of the thiocyanates, (such as calcium thiocyanate), lithium bromide and the salts and salt mixtures that are "solvent" members of the so-called "lyotropic" series as are disclosed among other places, in U.S. 2,140,921; 2,425,192; 2,648,592; 2,648,593; 2,648,646; 2,648,648; and 2,648,649.

Fibers produced from acrylonitrile polymers have excellent physical properties but do not have the inherent ability to inhibit the growth of bacteria. The textile industry is particularly interested in a fibrous material useful for the production of blankets, carpeting and the like, which has the desirable properties of polyacrylonitrile or fiber-forming copolymers containing at least 85 weight percent of acrylonitrile in the polymer molecule and in addition has the ability to inhibit the growth of bacteria and to destroy existing bacteria. It is also highly desirable to prepare heat-shrinkable, flexible films useful for bottle closures and the like applications which have long-lasting bacteriostatic properties.

Fabricated acrylonitrile polymer films textile fibers and like filamentous articles derived from salt-spinning processes are generically described as being capable of lying substantially in a single plane, having at least one major dimension, and at least one minor dimension less than about 0.1 inch, said articles being characterized by having orientation of the molecules parallel to one another and to a major axis of the article.

The foregoing statement of the problem has referred to fibers and films, and the invention will be illustrated with respect to fibers. The problem is more general, however, and applies to the defined compositions in the forms of sheets, tubes, rods and molded articles as well as films, fibers and other filaments.

It is the primary object of this invention to provide compositions of matter containing at least 85 weight percent of acrylonitrile in the polymer molecule which have long-lasting bacteriostatic properties.

A further object is to provide shaped articles from the compositions of the invention which have long-lasting bacteriostatic properties.

Other and related objects will become evident from the following specification and claims.

These objects are realized, according to the invention, by dispersing within the fiber-forming acrylonitrile polymers defined herein at least about 0.5 weight percent and preferably from about 0.5 to 20 weight percent based on the weight of the fiber-forming polymer of 2,4-dihydroxybenzophenone.

Articles made from the resulting compositions show pronounced bacteriostatic properties even after prolonged treatment with a heated aqueous detergent system.

According to a preferred embodiment of the present invention, a polymer containing at least 85 percent acrylonitrile in the polymer molecule, as described herein, is spun from an aqueous saline solution thereof into an aqueous coagulant. The coagulated product is stretched to effect orientation and is washed in any conventional manner to extract saline constituents and is finally irreversibly dried. The compound 2,4-dihydroxybenzophenone can be incorporated in the spun article during the course of its manufacture or after it is reduced to its final dimensions and irreversibly dried.

The invention is applicable to products made by dry-spinning or wet-spinning from organic solutions of the polymer, as well as wet-spinning of aqueous saline solutions of the polymer.

The acrylonitrile polymer employed in practice of the present invention is advantageously, polyacrylonitrile, although, as is readily apparent, any of the well known fiber and film-forming copolymers thereof that contain, polymerized in the polymer molecule, at least 85 weight percent of acrylonitrile with at least one other ethylenically unsaturated monomer that is copolymerizable with acrylonitrile may, beneficially, be utilized. The acrylonitrile polymer employed is soluble in an aqueous saline solvent which, usually, has therein at least about 50–60 weight percent of zinc chloride or its saline equivalents. U.S. 2,776,946, among many other reference sources, exemplifies many of the monomers which may be copolymerized or interpolymerized with acrylonitrile to produce binary or ternary acrylonitrile copolymers that are useful in the practice of the invention.

The compound 2,4-dihydroxybenzophenone, hereafter called bacteriostatic agent, is well known to those skilled in the art, the preparation of which is accomplished by known methods wherein, for example, equimolar amounts of resorcinol and benzoyl chloride are reacted together via the "Fries" or "Friedel-Crafts" type reaction procedures.

The bacteriostatic agent must be present in the shaped article in amounts of at least about 0.5 percent by weight, preferably 0.5 to 20 percent by weight based on the weight of the polymer. The permissible maximum proportion depends on the limit of its compatibility with the organic spinning solution or aqueous saline solution, as well as the polymeric material contained therein. The maximum limit is generally about 20 weight percent, based on the weight of the acrylonitrile polymer.

The bacteriostatic agent can be added to the acrylonitrile polymer spinning solution in a mutual solvent therefor, or by milling said bacteriostatic agent to finely divided particles which are suspended in a small amount of the spinning solution media to form a concentrate thereof, followed by addition of said concentrate to the spinning solution with stirring.

Alternatively, the bacteriostatic agent can be incorporated into the water-swollen aquagel or finally oriented, irreversibly dried article by soaking the article in an aqueous solution of the bacteriostatic agent.

The time required for the aquagel or irreversibly dried article to absorb the bacteriostatic agent is very brief, and varies with the concentration of the liquid from which the bacteriostatic agent is applied, and the temperature of the application. Generally, enough of the bacteriostatic agent defined herein, is absorbed by the aquagel or irreversibly dried article in about 5 minutes or less No adverse effect is found when the polymeric article is soaked in the aqueous bacteriostatic solution for periods for several days.

The bacteriostatic agent useful for the purposes of the present invention may be used in aqueous solutions which may be of any desired or convenient concentration. Thus, solutions containing as little as 0.1 percent by weight or less of the bacteriostatic agent defined herein have been used successfully.

The time and temperature of treatment for incorporating the bacteriostatic agent of the present invention into thy polymeric article either in its water-swollen aquagel form or completely oriented finally dried form, should be correlated as to cause the article to absorb at least about 0.5 weight percent of the bacteriostatic agent, based on the weight of the fiber-forming polymer. Amounts as high as 20 percent are unobjectionable. The temperature of treatment may be any temperature at which the aqueous bacteriostatic solution is a liquid, however, it is convenient to effect the treatment at temperatures of about 95° C.

It will be appreciated by those skilled in the art that various other additives and finishing agents commonly employed in the fiber and filament arts can be added to the compositions of the present invention. Such materials include typically, for example, plasticizers, lubricants, dye assistants, dyes and pigments.

The following example, wherein all parts and percentages are to be taken by weight, illustrates the present invention but is not to be construed as limiting its scope.

*Example 1*

A length (4 inches) of water-swollen, unstretched tow, formed by extrusion of an aqueous saline solution of polyacrylonitrile through a 10 mil, 300 hole metal spinneret into an aqueous coagulating bath, was washed thoroughly to remove salt. It was then allowed to stand in 10 milliliters of a 0.1 percent aqueous solution of 2,4-dihydroxybenzophenone at 95° C. for a period of about 10 minutes, until the fibers had absorbed at least about 0.5 weight percent of the 2,4-dihydroxyphenone based on the weight of the fiber-forming polymer. The tow was removed from the impregnating solution, rinsed briefly in tap water and dried over night under normal room temperatures.

The dried, impregnated tow was immersed in an aqueous bath containing 0.1 weight percent of Igepon T (sodium N-methyl-N-oleyl taurate) and heated with stirring at 95° C. for a period of about 0.5 hour. The tow was then rinsed with tap water and dried overnight at normal room temperatures.

The dried filament tow was placed on the surface of a nutrient agar seeded with *Staphylococcus aureus* contained on the surface of a hardened agar media plate, and subsequently incubated for a period of about 48 hours at a temperature between about 30° C. and 37° C. A zone of inhibition was observed around the test specimen following the incubation period.

Similar good results are obtained using any concentration between about 5 weight percent to 20 weight percent based on the weight of the fiber-forming polymer of 2,4-dihydroxybenzophenone.

Additionally, similar good results are obtained when the prescribed amounts of 2,4-dihydroxybenzophenone are incorporated in a finally shaped, irreversible dried fiber from an aqueous solution as described herein.

It has also been found that similar good results are obtained when the prescribed amounts of 2,4-dihydroxybenzophenone are added directly to the aqueous polymeric saline spinning solution prior to formation of the finally shaped article subsequently produced therefrom.

Similar good results are also obtained when fiber and film-forming acrylonitrile polymers containing at least 85 weight percent of polymerized acrylonitrile and up to 15 weight percent of one or more of such copolymerizable materials as vinyl chloride, vinyl acetate, methyl and other alkyl acrylates or methacrylates, the vinyl pyridines, allyl alcohol and many others well known to those skilled in the art are admixed with the prescribed amounts of the 2,4-dihydroxybenzophenone described herein.

What is claimed is:

1. Bacteriostatic compositions of matter, the essential constituents of which are (1) a fiber-forming acrylonitrile polymer, which polymer contains in the polymer molecule at least 85 weight percent of acrylonitrile, any balance being another monoethylenically unsaturated monomeric material that is copolymerizable with acrylonitrile, and (2) dispersed therein between about 0.5 and 20 weight percent, based on the weight of said fiber-forming acrylonitrile polymer of 2,4-dihydroxybenzophenone.

2. The compositions of claim 1, wherein said fiber-forming acrylonitrile polymer is polyacrylonitrile.

3. A polymeric article of manufacture having bacteriostatic properties, said article being capable of lying substantially in a single plane, having at least one major dimension, and at least one minor dimension less than 0.1 inch, comprised of (1) a fiber-forming acrylonitrile polymer, which polymer contains in the polymer molecule at least 85 weight percent of acrylonitrile, any balance being another monoethylenically unsaturated monomeric material that is copolymerizable with acrylonitrile and (2) dispersed therein between about 0.5 and 20 weight percent, based on the weight of the fiber-forming polymer, of 2,4-dihydroxybenzophenone.

4. The article of claim 3, wherein said fiber-forming polymer is polyacrylonitrile.

5. The article of claim 3, wherein said article is a filamentary structure having bacteriostatic properties.

References Cited by the Examiner

UNITED STATES PATENTS

| 2,919,200 | 12/59 | Dubin et al. | 260—45.95 |
| 2,990,385 | 6/61 | Schmutzler | 260—45.95 |

OTHER REFERENCES

Fujikawa: Chem. Abs., vol. 47, page 12508C (1953).
Strobel: American Dyestuff Reporter, Aug. 7, 1961, pages 21–26.
Matsui et al.: Chem. Abs., vol. 46, page 4608A (1952).
Matsui et al.: Chem. Abs., vol. 47, page 815C (1953).
Moore et al.: Chem Abs., vol. 50, page 285h (1956).

JOSEPH L. SCHOFER, *Primary Examiner.*

LOUISE P. QUAST, DONALD E. CZAJA, *Examiners.*